United States Patent [19]

Schmidt et al.

[11] Patent Number: 4,481,350

[45] Date of Patent: Nov. 6, 1984

[54] PROCESS FOR THE PREPARATION OF THERMOPLASTIC AROMATIC POLYPHOSPHONATES CONTAINING SMALL PROPORTIONS OF CARBONATE STRUCTURES AND PRODUCT THEREOF

[75] Inventors: Manfred Schmidt; Ludwig Bottenbruch; Dieter Freitag, all of Krefeld, Fed. Rep. of Germany

[73] Assignee: Bayer Aktiengesellschaft, Leverkusen, Fed. Rep. of Germany

[21] Appl. No.: 595,461

[22] Filed: Mar. 30, 1984

Related U.S. Application Data

[63] Continuation of Ser. No. 360,069, Mar. 22, 1982, abandoned.

[51] Int. Cl.$^3$ .............................................. C08G 79/04
[52] U.S. Cl. .................................. 528/167; 528/125; 528/126; 528/128; 528/169
[58] Field of Search ............... 528/125, 126, 128, 167, 528/169

[56] References Cited

U.S. PATENT DOCUMENTS

| | | | |
|---|---|---|---|
| 4,322,520 | 3/1982 | Schmidt et al. | 528/167 |
| 4,331,614 | 5/1982 | Schmidt et al. | 528/167 |
| 4,374,971 | 2/1983 | Schmidt | 528/167 |
| 4,401,802 | 8/1983 | Schmidt | 528/167 |

FOREIGN PATENT DOCUMENTS 3001863  7/1981  Fed. Rep. of Germany ...... 528/167

*Primary Examiner*—Lester L. Lee
*Attorney, Agent, or Firm*—Connolly and Hutz

[57] ABSTRACT

The subject of the present invention is a process for the preparation of polyphosphonates containing carbonate structures in amounts of 0.3 to 4.5 mol %, relative to the sum of phosphonate and carbonate structural units, which is characterized in that diaryl phosphonates are reacted with diphenols in the presence of neutral transesterification catalysts, and the reaction is then completed by adding diaryl carbonate.

10 Claims, No Drawings

PROCESS FOR THE PREPARATION OF THERMOPLASTIC AROMATIC POLYPHOSPHONATES CONTAINING SMALL PROPORTIONS OF CARBONATE STRUCTURES AND PRODUCT THEREOF

This is a continuation of copending application Ser. No. 360,069 filed Mar. 22, 1982 and now abandoned.

The subject of the present invention is a process for the preparation of polyphosphonates containing carbonate structures in amounts of 0.3 to 4.5 mol %, preferably of 0.5 to 2.5 mol %, relative to the sum of phosphonate and carbonate structural units, which is characterised in that diphenols are reacted with diaryl phosphonates in a molar ratio of 1.03 to 0.97, in the presence of neutral trans-esterification catalysts, at temperatures of 230° to 320° C., in particular of 250° to 320° C., and the volatile monohydroxyaryl compounds are distilled off over a period of 1.5 to 2.5 hours, at a pressure falling from 500 to not less than 2 mbars, in particular from 400 to not less than 5 mbars, and the reaction is then completed over a period of 1 to 2 hours by adding diaryl carbonate in amounts of 0.5 mol % to 8.5 mol %, preferably 1 mol % to 4.9 mol %, relative to the sum in mols of diaryl phosphonate and diaryl carbonate employed, at temperatures of 250° to 230° C., in particular of 280° to 320° C., and at a pressure falling from 300 to not less than 1 mbar to 0.2 mbar.

The molar ratio of diaryl phosphonate to be employed to diaryl carbonate is from 99.5–91.5 mol % to 0.5–8.5 mol %, preferably from 99–95.1 mol % to 1–4.9 mol %, in each case relative to the sum in mols of diaryl phosphonate and diaryl carbonate.

The molar ratio of the diphenols to the sum of the diaryl phosphonates and diaryl carbonates is in each case between 0.91 and 0.99, preferably between 0.93 and 0.97.

The amount of neutral trans-esterification catalysts is in each case between $10^{-7}$ and $10^{-1}$ mol %, preferably $7 \cdot 10^{-6}$ and $8 \cdot 10^{-2}$ mol %, relative to mols of diphenols employed.

Trans-esterification catalysts used are $C_1$–$C_{18}$-tetraalkyl titanates, $C_2$–$C_4$-dialkyl-tin oxides, $C_2$–$C_4$-dialkyl-$C_1$–$C_4$-dialkoxy-tin compounds, $C_3$–$C_{18}$-tetraalkyl zirconates, $C_2$–$C_{18}$-trialkyl vanadylates, zinc acetate, tributyl-tin acetate or at least one of the above group mixed with germanium dioxide and/or titanium dioxide.

The process according to the invention for the preparation of polyphosphonates containing small proportions of carbonate structures has the advantage of a faster reaction rate than the analogous preparation of pure polyphosphonates without carbonate structural units, according to copending application Ser. Nos. 160,646 filed June 18, 1980 now U.S. Pat. No. 4,331,614 and 201,254 filed Oct. 27, 1980 now U.S. Pat. No. 4,374,971.

Compared with the polyphosphonatocarbonates containing higher proportions of carbonate structural units, according to copending application Ser. Nos. 160,644 filed June 18, 1980 now U.S. Pat. No. 4,322,520 and 224,077 filed Jan. 12, 1981, now U.S. Pat. No. 4,401,802 the polyphosphonates containing small proportions of carbonate structural units, obtainable according to the invention, still possess the characteristic spectrum of properties of the polyphosphonates.

Moreover, the polyphosphonatocarbonates obtainable according to the invention possess a better resistance to heat-ageing than the polyphosphonates or polyphosphonatocarbonates obtained using alkaline compounds as trans-esterification catalysts (according to application Ser. Nos. 160,646 filed June 18, 1980 and 160,644 filed June 18, 1980).

Neutral trans-esterification catalysts which are suitable according to the invention are:

(a) $C_1$–$C_{18}$-tetraalkyl titanates such as, for example, titanium tetraethylate, titanium tetrapropylate, titanium tetraisopropylate, titanium tetrabutylate, titanium tetraoctanoate and titanium tetrastearate, (b) $C_2$–$C_4$-dialkyl-tin oxides such as, for example, diisopropyl-tin oxide and dibutyl-tin oxide, (c) $C_2$–$C_4$-dialkyl-$C_1$–$C_4$-dialkoxy-tin compounds such as, for example, diisopropyl-dimethoxy-tin, dubutyl-diisopropoxy-tin and dibutyl-dimethoxy-tin, (d) $C_3$–$C_{18}$-tetraalkyl zirconates such as, for example, zirconium tetraacetylacetonate, zirconium tetrabutylate, zirconium tetraoctanoate and zirconium tetrastearate, (e) $C_2$–$C_{18}$-trialkyl vanadylates such as, for example, vanadyl ethylate, $VO(OC_2H_5)_3$, vanadyl isopropylate, $VO(O\text{—}i\text{—}C_3H_7)_3$, and vanadyl n-butylate, $VO(O\text{—}n\text{—}C_4H_9)_3$, (f) zinc acetate or tributyl-tin acetate, and (g) mixtures of germanium dioxide or titanium dioxide with at least one of the catalysts listed under (a) to (f).

The combinations of catalysts which can be employed according to (g) are present in the weight ratio of 1:3 to 3:1.

The thermoplastic aromatic polyphosphonatocarbonates prepared by the process according to the invention, and having average molecular weights (number-average $\overline{M}_n$) of at least 11,000, preferably of 11,000 to 200,000 and in particular of 20,000 to 80,000, correspond to the formula (1)

wherein

E is —M—O—Ar, Ar being an aryl radical preferably having 6 to 14 C atoms, in particular phenyl, $C_1$–$C_4$-alkyl-substituted phenyl and/or halogen-substituted phenyl (halogen=F, Cl, Br), M is the linkage

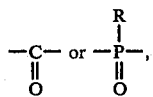

the molar ratio of the linkages

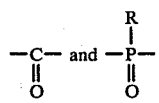

being in each case, on average, between 4.5:95.5 and 0.3:99.7, preferably between 2.5:97.5 and 0.5:99.5, and R being at least one of the radicals: $C_1$–$C_{12}$-alkyl, $C_2$–$C_{12}$-alkenyl, $C_6$–$C_{30}$-cycloalkyl, $C_6$–$C_{30}$-cycloalkenyl, $C_6$–$C_{30}$-aryl, $C_7$–$C_{30}$-arylalkyl or $C_8$–$C_{30}$-arylalkenyl, the particular aryl group being unsubstituted or substituted by 1 to 5 $C_1$–$C_4$-alkyl groups or by 1 to 5 halogen atoms (such as, for example, F, Cl or Br) or by the said alkyl groups and halogen atoms, X is the radical of a diphenol and can denote:

phenylene, biphenylene, $C_2-C_4$—alkylene-bis-phenylene, $C_1-C_5$—alkylidene-bis-phenylene, $C_5-C_{12}$—cycloalkylene-bis-phenylene, $C_5-C_{12}$—cycloalkylidene-bis-phenylene, thiobisphenylene, oxy-bis-phenylene, sulphonyl-bis-phenylene, carbonyl-bis-phenylene or naphthylene, each phenylene nucleus being unsubstituted or substituted by 1 to 4 $C_1-C_4$-alkyl groups or by 1 to 4 halogen atoms (F, Cl or Br) or by the said alkyl groups and halogen atoms, and the naphthylene nucleus being unsubstituted or substituted by 1 to 6 of at least one of the said groups or halogen atoms, and n is the average degree of polymerisation which results from the particular molecular weights $\overline{M}_n$ (number-average) of at least 11,000, preferably 11,000 to 200,000 and in particular 20,000 to 80,000, of the polyphosphonatocarbonates.

The polyphosphonatocarbonates obtainable according to the invention can in each case be composed either of identical diphenol radicals X or of different diphenol radicals X, that is to say 2 or more than 2 different diphenol radicals X. Preferably, the above definitions have the following meaning:

R=at least one of the radicals methyl or phenyl, in particular methyl,

X=at least one of the radicals phenylene, biphenylene, $C_2-C_4$-alkylene-bis-phenylene or $C_1-C_5$-alkylidene-bis-phenylene, it being possible for each phenylene nucleus to be substituted by 1 to 4 methyl groups, or cyclohexylene-bis-phenylene, cyclohexylidene-bis-phenylene, thio-bis-phenylene or sulphonyl-bis-phenylene, in particular $C_1-C_4$-alkylidene-bis-phenylene, it being possible for each phenylene nucleus to be substituted by one or two methyl groups, and Ar=phenyl or p-toluyl.

Diaryl phosphonates which are suitable according to the invention are those of the formula (2)

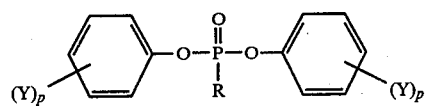

wherein
R has the meaning given for the compounds of the formula (1),
Y is a $C_1-C_4$-alkyl group and/or F, Cl or Br, and
p is 0 or an integer from 1 to 5.

Halogen-free diphenyl alkylphosphonates and arylphosphonates are particularly preferred; diphenyl methylphosphonate and diphenyl phenylphosphonate are especially preferred.

Further examples of diaryl phosphonates which are suitable according to the invention are diphenyl cyclohexylphosphonate, diphenyl ethylphosphonate, diphenyl 2-phenyl-ethylenephosphonate, diphenyl butylphosphonate and diphenyl isopropylphosphonate.

Preferred diphenols correspond to the formulae (3) and (4)

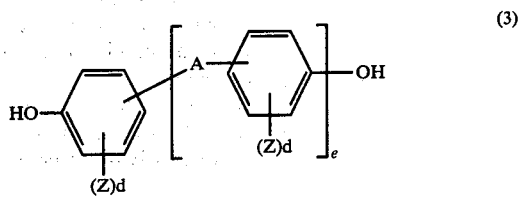

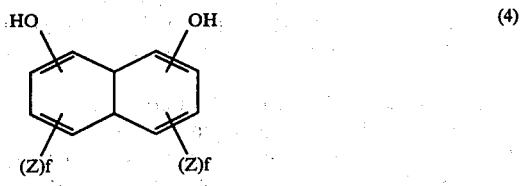

wherein
A denotes a single bond, an alkylene group having 2 to 4 C atoms, an alkylidene group having 1 to 5 C atoms, a cycloalkylene group having 5 or 6 C atoms, a cycloalkylidene group having 5 to 6 C atoms, a sulphonyl group, a carbonyl group, oxygen or sulphur,
e denotes the number 0 or 1,
Z denotes F, Cl, Br or $C_1-C_4$-alkyl, and several radicals Z in one aryl radical are identical or different,
d denotes 0 or the integers 1 to 4, and
f denotes 0 or the integers 1 to 3.

Particularly preferred compounds are those of the formula (3) wherein e=1 and A denotes a single bond, the isopropylidene radical, the $SO_2$ group or sulphur, and d=zero, and in particular 4,4'-dihydroxybiphenyl, 2,2-bis-(4-hydroxyphenyl)-propane (=bisphenol A) and 4,4-dihydroxydiphenyl sulphone.

Diaryl carbonates which are suitable according to the invention correspond to the formula (5)

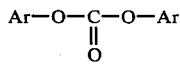

wherein Ar has the meaning given for the formula (1) and is preferably

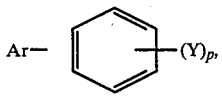

Y and p corresponding to the meaning for the formula (2).

Diphenyl carbonate or di-(p-toluyl) carbonate, for example, are preferably suitable. Diphenyl carbonate is preferred in particular.

The high-molecular thermoplastic aromatic polyphosphonatocarbonates obtained by the process according to the invention can be branched by the incorporation of small amounts, preferably of amounts of between 0.05 and 3.0 mol % (relative to 100 mol % of diphenols employed), of compounds which are trifunctional or more than trifunctional, for example those having 3 or more than 3 phenolic hydroxyl groups. Triaryl phosphates, such as, for example, triphenyl phosphate, in amounts of between 0.05 and 3.0 mol % (relative to 100 mol % of the mixture of diaryl carbonate and diaryl phosphonate employed), can also be co-condensed as the trifunctional branching component, whereby the resulting aromatic polyphosphonatocarbonate is branched by phosphate groups.

Examples of some of the branching phenolic compounds, having 3 or more than 3 phenolic hydroxyl groups, which can be used are phloroglucinol, 4,6-dimethyl-2,4,6-tri-(4-hydroxy-phenyl)-hept-2-ene, 4,6-dimethyl-2,4,6-tri-(4-hydroxy-phenyl)-heptane, 1,3,5-tri-(4-hydroxyphenyl)-benzene, 1,1,1-tri-(4-hydroxyphenyl)-ethane, tri-(4-hydroxy-phenyl)-phenylmethane, 2,2-bis-[4,4-bis-(4-hydroxy-phenyl)-cyclohexyl]-propane, 2,4-bis-(4-hydroxyphenyl-isopropyl)-phenol, 2,6-bis-(2-hydroxy-5'-methyl-benzyl)-4-methylphenol, 2-(4-hydroxyphenyl)-2-(2,4-dihydroxyphenyl)-propane and 1,4-bis-(4,4''-dihydroxytriphenyl-methyl)-benzene.

However, triphenyl trimesate and triphenyl cyanurate can also be used as branching compounds.

All the starting materials employed for the transesterification should have degrees of purity of >99.1% by weight, preferably >99.6% by weight.

In detail, the process according to the invention is carried out, for example, in the following manner:

Diaryl phosphonates and, if appropriate, branching esters, such as triphenyl trimesate, are reacted with the aromatic dihydroxy compounds and, if appropriate, the branching trihydroxy or tetrahydroxy compounds, in an oxygen-free atmosphere, that is to say in the presence of an inert gas, such as, for example, nitrogen or carbon dioxide, and in the presence of the said neutral catalysts, at temperatures between 230° and 320° C., in particular between 250° and 320° C., the volatile monohydroxyaryl compounds being distilled off over a period of 1.5 to 2.5 hours, with intensive stirring, at a pressure falling from 500 mbars to not less than 2 mbars, in particular a pressure falling from 400 mbars to not less than 5 mbars.

By passing in inert gas, the pressure in the reaction vessel is increased to 500-300 mbars, the corresponding amount of 0.5 to 8.5 mol % of diphenyl carbonate is added and the reaction is then completed over a period of 1 to 2 hours, the volatile aromatic monohydroxyaryl compounds and the excess diphenyl carbonate or excess diaryl phosphonate being distilled off at 250° to 320° C., in particular at 280° to 320° C., and at a pressure falling from 300 mbars to not less than 1 mbar to 0.2 mbar.

After the polycondensation has ended, the polyphosphonatocarbonate melt formed is converted in the customary manner to granules or directly to shaped structures, such as films, fibres or bristles. The polyphosphonatocarbonates obtained by the process according to the invention can be processed in the melt, by means of industrially conventional processing equipment, such as extruders and injection-moulding machines, to give mouldings with a high heat distortion point, and, unmodified, have a similarly outstanding fire resistance and similarly good mechanical properties to those of the polyphosphonates prepared according to Ser. No. 201,254 filed Oct. 27, 1980.

The polyphosphonatocarbonates obtainable according to the invention are soluble in methylene chloride, 1,1,2,2-tetrachloroethane, chlorobenzene, 1,2-dichlorobenzene, chloroform, 1,1,2-trichloroethylene, dioxane and hexamethylene-phosphorotriamide (HMPT), with the exception of the polyphosphonatocarbonates of the structure (1) wherein X is the thio-bis-phenylene radical.

Moreover, the materials customary for polycarbonates, such as pigments, antistatic agents, mould-release agents, heat stabilisers, ultra-violet light stabilisers and/or reinforcing fillers, can be admixed with the aromatic polyphosphonatocarbonates obtainable according to the invention.

The thermoplastic, aromatic, preferably halogen-free polyphosphonates according to the invention can be applied in any field in which synthetic thermoplastic materials very high fire resistance are required, and in which the evolution of toxic pyrolysis gases under the action of very high temperatures is also to be avoided. Such fields of application are to be found, for example, in vehicle construction, in aircraft construction, in the space industry or in the field of safety technology.

The thermoplastic aromatic polyphosphonatocarbonates, obtainable according to the invention can be extruded at 240° to 320° C. and shaped into test-pieces.

The heat distortion point was tested by measuring the Vicat softening point, VSP, according to DIN 53 460 or ISO/R 75. The behaviour under impact stress was tested by measuring the Charpy impact strength $a_n$ according to DIN 53 453 or according to ASTM D 256 and also by measuring the Charpy notched impact strength $a_k$ according to DIN 53 453 or ASTM D 256. The hardness was measured by measuring the ball indentation hardness HK according to DIN 53 456. The mechanical-elastic properties were tested by means of stress-strain experiments, for example by measuring the modulus of elasticity under flexion according to DIN 53 457, by measuring the modulus of elasticity under tension according to DIN 53 457, and by measuring the tensile strength $\sigma_R$, the elongation at break $\epsilon_R$, the yield stress $\sigma_S$ and the elongation at yield $\epsilon_S$ according to DIN 53 455/1968 or ASTM D 638.

The relative solution viscosities of the polyphosphonatocarbonates according to the invention were measured in 0.5% strength by weight solution in methylene chloride at 25° C.

The behaviour towards fire was tested by measuring the $O_2$ index according to ASTM D 2863-70 and also by measuring the after-burn time according to the UL test (subj. 94).

In this test, test-bars with the dimensions: 127×12.7×1.6 mm (1/16") and 127×12.7×3.2 mm (⅛") are subjected to the testing procedure according to Under-writers Laboratories, Inc. Bulletin 94, Burning Test for Classifying Materials.

According to this testing procedure, the materials tested in this way were classified either UL-94 V-0, UL-94 V-I or UL-94 V-II, on the basis of the results obtained on 10 specimens. The criteria for each of these V classifications according to UL-94 are briefly as follows:

UL-94 V-0 The average flaming and/or glowing combustion time after removal of the test flame should not exceed 5 seconds and none of the specimens should drip particles which ignite absorbent cotton
UL-94 V-I The average flaming and/or glowing combustion time after removal of the test flame should not exceed 25 seconds and none of the specimens should drip particles which ignite absorbent cotton.
UL-94 V-II The average flaming and/or glowing combustion time after removal of the test flame should not exceed 25 seconds and the specimens drip flaming particles which ignite absorbent cotton.

Furthermore, a test-bar which burnt for more than 25 seconds after removal of the test flame was not classified according to UL-94, but was designated as "burns" according to the standard conditions of the present invention. The UL-94 specification further requires that all test-bars in one experiment must satisfy the particular V grading; otherwise the 10 test-bars obtain the grading of the worst individual bar. If, for example, a bar is graded UL-94 V-II and the other 9 test-bars are graded UL-94 V-0, then all 10 bars obtain the grading UL-94 V-II.

EXAMPLE 1

Poly-(4,4'-dihydroxybiphenyl methylphosphonate) containing 1.7 mol % of carbonate structures

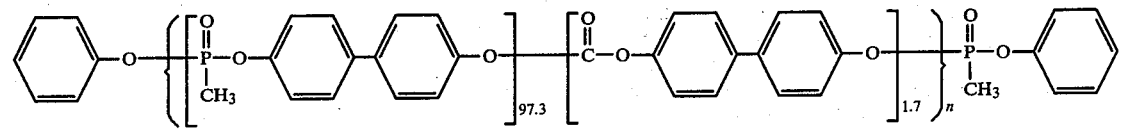

(n ~ 1.0)

4,650 g (25 mols ≙ 100 mol %) of 4,4'-dihydroxybiphenyl, 6,325 g (25.5 mols ≙ 102 mol %) of diphenyl methylphosphonate and 0.35 g ($7.53 \times 10^{-3}$% by weight, relative to the weight of 4,4'-dihydroxybiphenyl) of $Zn(OAc)_2$ ($7.6 \times 10^{-2}$ mol %) are preheated to 285° C. under nitrogen. 87 to 88% of the phenol is then distilled off through a column over a period of 2.5 hours, under $N_2$, at 285° to 295° C. and at a pressure falling from 290° to 10 mm Hg. 188 g (0.88 mol ≙ 3.5 mol %) of diphenyl carbonate are added, the mixture is left to react for 5 minutes at a vacuum of 50 mm Hg and at 300° C., and a further 8 to 9% of phenol is distilled off through the column at an internal pressure falling to 7 mm Hg. The condensation is then ended over a period of 1.5 hours, at 300° to 312° C. and at 7 to 0.5 mm Hg, a further amount of about 4% of distillate being obtained on bypassing the column. The brown viscous polymer has a relative solution viscosity η rel (measured at 25° C. in 0.5% strength by weight solution in $CH_2Cl_2$) of 1.280. The glass transition temperature $T_G$ is 137° C. (determined by differential thermal analysis).

The content of carbonate structures is 1.7 mol % (determined by IR spectroscopy). The phosphorus content is 12.4% by weight.

EXAMPLE 2

Poly-(bis-2-(4-hydroxyphenyl)-propane methylphosphonate) containing 1.85 mol % of carbonate structural units

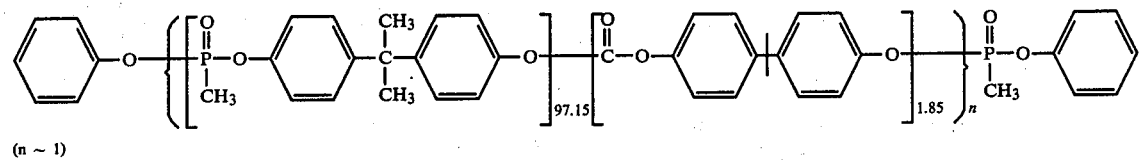

(n ~ 1)

5,700 g (=25 mols ≙ 100 mol %) of bis-2-(4-hydroxyphenyl)-propane, 6,280 g (=25.32 mols ≙ 101.3 mol %) of diphenyl methylphosphonate, 36.5 g ($8.33 \times 10^{-2}$ mols ≙ 0.5 mol %) of triphenyl trimesate and 0.35 g ($1.4 \times 10^{-2}$% by weight, relative to bis-2-(4-hydroxyphenyl)-propane) of $Zn(OAc)_2$ ($7.6 \times 10^{-2}$ mol %) are preheated to 270° C. under nitrogen. 98% of the phenol is then distilled off through a column over a period of 2.5 hours, under nitrogen, at 270° to 300° C. and at a vacuum of 300 to 7 mm Hg. 205 g (0.958 mol ≙ 3.83 mol %) of diphenyl carbonate are added, the mixture is left to react for 5 minutes at 300° C. and at an internal pressure of 60 mm Hg, and the condensation is ended over a period of 2 hours, at 300° C. and at an internal pressure falling to 0.7 mm Hg, a further 2% of distillate being separated off (the column is bypassed).

The brown viscous polymer has a relative solution viscosity η rel (measured at 25° C. in 0.5% strength by weight solution in $CH_2Cl_2$) of 1.293. The glass transition temperature is 90° C. (determined by differential thermal analysis). The content of carbonate structures is 1.85 mol % (determined by IR spectroscopy). The phosphorus content is 10.2% by weight.

EXAMPLE 3

Poly-(4,4'-dihydroxybiphenyl phenylphosphonate) containing 2.1 mol % of carbonate structural units

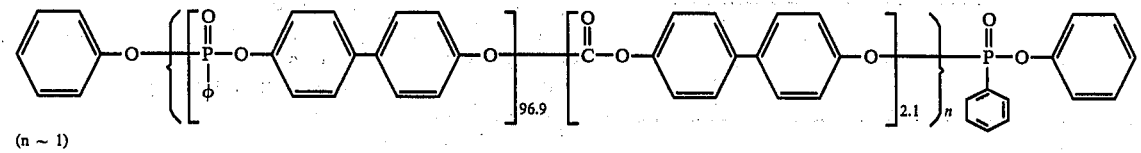

(n ~ 1)

4,650 g (=25 mols≙100 mol %) of 4,4'-dihydroxybiphenyl, 7,850 g (=25.32 mols≙101.3 mol %) of diphenyl phenylphosphonate and 0.2 g (1.3×10$^{-2}$% by weight, relative to 4,4'-dihydroxybiphenyl) of Zn(OAc)$_2$ (4.3×10$^{-2}$ mol %) are preheated to 290° C. under nitrogen. 96% of the phenol is then distilled off through a column over a period of 2 hours, under nitrogen, at 290° to 310° C. and at an internal pressure of 200 to 7 mm Hg. 214 g (1.0 mol≙4 mol %) of diphenyl carbonate are added, the mixture is left to react for 5 minutes at 310° C. and at an internal pressure of 60 mm Hg, and the condensation is ended over a period of 1.5 hours, at 310° to 318° C. and at an internal pressure falling to 0.5 mm Hg, a further 4% of distillate being obtained (the column is bypassed).

The viscous amber-coloured polymer has a relative solution viscosity η rel (measured at 25° C. in 0.5% strength by weight solution in CH$_2$Cl$_2$) of 1.266.

The glass transition temperature $T_G$ is 147° C. (determined by differential thermal analysis). The content of carbonate structure is 2.1 mol % (determined by IR spectroscopy). The phosphorus content is 9.85% by weight.

EXAMPLE 4

Poly-(4,4'-dihydroxybiphenyl methylphosphonate) containing 0.3 mol % of carbonate structural units 4,650 g (100 mol %) of 4,4'-dihydroxybiphenyl, 6,325 g (102 mol %) of diphenyl methylphosphonate and 0.35 g (7.53×10$^{-3}$% by weight, relative to the weight of 4,4'-dihydroxybiphenyl) of zinc acetate (7.6×10$^{-2}$ mol %) are preheated to 285° C. under N$_2$. 87 to 88% of the phenol is distilled off over a period of 2.5 hours, at 285° to 295° C. and at 290 to 10 mm Hg.

26.86 g (0.126 mol≙0.5 mol %) of diphenyl carbonate are added, the mixture is left to react for 5 minutes at a pressure of 50 mm Hg and at 300° C., and a further 4 to 6% of phenol is distilled off at an internal pressure falling to 7 mm Hg. The condensation is then ended over a period of 1.5 hours, at 300° to 312° C. and at an internal pressure of 7 to 0.5 mm Hg, a further 12 to 13% of distillate being obtained on bypassing the column.

The brown viscous polymer has a relative solution viscosity (measured at 25° C. in 0.5% strength by weight solution in CH$_2$Cl$_2$) of 1.270; the glass transition temperature is 137° C. (determined by differential thermal analysis).

The content of carbonate structures is 0.3 mol % (determined by IR spectroscopy).

COMPARISON EXAMPLE

Comparison with the polyphosphonate of Example 1 from application Ser. No. 160,646 filed Oct. 18, 1980.

6,204 g (25.02 mols) of diphenyl methylphosphonate, 4,424 g (23.78 mols) of 4,4'-dihydroxybiphenyl, 7.6 g (1.21×10$^{-2}$ mols) of 1,4-bis-(4,4''-dihydroxytriphenylmethyl)-benzene and 0.2 g (1.72·10$^{-3}$ mols) of sodium phenolate are mixed intensively in an autoclave at 250° C., under nitrogen. Phenol is distilled off through a column heated to 100° C., over a period of 3 hours, at a pressure falling from 250 to 100 mbars and at a temperature rising from 250° to 265° C. The transesterification is then continued for 5 hours under a pressure falling gradually to 0.3 mbar and at an internal temperature rising to 310° C., the viscosity of the melt increasing. The autoclave is flushed with nitrogen, the polymer is left to deposit for 1 hour at 300° C. and with the stirrer stationary, and the product is isolated by extrusion under pressure (about 10 atmospheres) and granulation of the melt strand. This gives 5.2 kg of a high-molecular amorphous polyphosphonate having a number-average molecular weight $\overline{M}_n$ of 27,600 and a relative solution viscosity η rel of 1.321 (measured at 25° C. in a 0.5% strength by weight solution in methylene chloride). P=12.6% by weight.

| Fire resistance values and mechanical test values of this polyphosphonate | | |
|---|---|---|
| Test | Test standard | Test value |
| O$_2$ index | ASTM-D 2863-70 | 75% VO |
| UL test (Subj. 94) | | (1/16") After-burn time: 0 second |
| Vicat B | DIN 53 460 | 130° C. |
| Impact strength a$_n$ | DIN 53 453 | unbroken |
| Notched impact strength a$_k$ | DIN 53 453 | 32 |
| Ball indentation hardness HK | DIN 53 456 | 102 MPa |
| Modulus of elasticity under flexion | DIN 53 457 | 2,610 MPa |
| Flexural strength | DIN 53 457 | 59 MPa |
| Modulus of elasticity under tension | DIN 53 457 | 2,420 MPa |
| Yield stress σ$_S$ | DIN 53 455 (1968) | 56 MPa |
| Elongation at yield ε$_S$ | DIN 53 455 | 8% |
| Tensile strength σ$_R$ | DIN 53 455 | 44 MPa |
| Elongation at break ε$_R$ | DIN 53 455 | 21% |

The same values for fire resistance and mechanical characteristics apply to the polymethylphosphonate, according to the invention, of Example 1 of the present patent application. However, the polyphosphonatocarbonates of the present invention have a substantially better resistance to heat-ageing than those prepared according to application Ser. No. 160,646 filed June 18, 1980, the following comparison:

50μ thick films of the polyphosphonatocarbonate of Example 1 of the present patent application, and of the polyphosphonate of the above comparison example, are prepared from methylene chloride and heat-aged for 7 days at 100° C. in air.

The following table summarises the results obtained from this heat-ageing experiment, the molecular weight degradation caused by the heat-ageing being verified by means of the relative solution viscosities, which are determined at 25° C. in 0.5% strength by weight solutions in methylene chloride.

TABLE

| Time difference | Example 1 according to the invention η rel | Comparison Example η rel |
| --- | --- | --- |
| 0 | 1.280 | 1.321 |
| 2 days | 1.280 | 1.305 |
| 4 days | 1.281 | 1.291 |
| 5 days | 1.279 | 1.280 |
| 7 days | 1.280 | 1.265 |

What is claimed is:

1. The process for preparation of a polyphosphonate polymer having from 0.3 to 4.5 mole percent carbonate moieties, on a molar basis relative to the molar sum of phosphonate and carbonate moieties, comprising the steps of
  (a) reacting a diphenol with a diaryl phosphonate of the formula

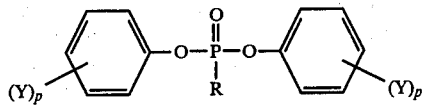

in a molar ratio of 1.03 to 0.97 in the presence of a neutral transesterification catalyst at temperatures of 230° to 320° C.,
wherein R is selected from the group consisting of alkyl having 1–12 carbon atoms, alkenyl having 2–12 carbon atoms, cycloalkyl having 6–30 carbon atoms, cycloalkenyl having 6–30 carbon atoms, aryl having 6–30 carbon atoms, arylalkyl having 7–30 carbon atoms and arylalkenyl having 8–30 carbon atoms with aryl moieties being unsubstituted or substituted by at least one of alkyl having 1–4 carbon atoms or halogen;
Y is alkyl having 1–4 carbon atoms or halogen;
P is zero or an integer from 1 to 5;
  (b) simultaneously removing volatile monohydroxyaryl compounds produced in the reaction by distillation at a pressure falling from 500 to not less than 2 mbars over a period of 1.5 to 2.5 hours; and
  (c) then completing the reaction by adding 0.5 to 8.5 mole percent of a diaryl carbonate on a molar basis relative to the sum in moles of diaryl phosphonate and diaryl carbonate reactants and continuing to remove volatile monohydroxyaryl compound by distillation at 250° to 320° C. for 1 to 2 hours at a pressure falling from 300 to not less than 0.2 mbar.

2. The process according to claim 1 to produce polyphosphonate having 0.5 to 2.5 mole percent carbonate moieties wherein the amount of diaryl carbonate added in step (c) is 1 to 4.9 mole percent based on the molar sum of diaryl phosphonate and diaryl carbonate.

3. The process according to claim 1 wherein the diphenol is a compound of the formula

HO—X—OH wherein X is phenylene, biphenylene, alkylene-bis-phenylene having 2–4 alkylene carbon atoms, alkylidene-bis-phenylene having 1–5 alkylidene carbon atoms, cycloalkylene-bis-phenylene having 5–12 cycloalkylene carbon atoms, cycloalkylidene-bis-phenylene having 5–12 alkylidene carbon atoms, thiobisphenylene, oxy-bis-phenylene sulphonyl-bis-phenylene, carbonyl-bis-phenylene or naphthylene, with each phenylene or naphthylene nucleus being unsubstituted or substituted by at least one of alkyl having 1–4 carbon atoms or halogen.

4. The process according to claim 1 wherein the diaryl carbonate is a compound of the formula

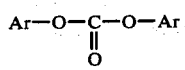

wherein Ar is aryl having 6–14 carbon atoms unsubstituted or substituted by at least one of alkyl having 1–4 carbon atoms or halogen.

5. The process according to claim 1 wherein the neutral transesterification catalyst is selected from the group consisting of tetraalkyl titanate having 1–18 carbon atoms in each alkyl moiety, dialkyl-tin oxide having 2–4 carbon atoms in each alkyl moiety, dialkyl-dialkoxy-tin having 2–4 carbon atoms in each alkyl moiety with each alkoxy moiety having 1–4 carbon atoms, tetraalkyl zirconate with each alkyl moiety having 3–18 carbon atoms, trialkyl vanadylate having 2–18 carbon atoms in each alkyl moiety, zinc acetate, tetrabutyl-tin acetate, and mixtures thereof with germanium dioxide or titanium dioxide in a weight ratio of 1:3 to 3:1.

6. The process according to claim 1 wherein the diphenol is 4,4'-dihydroxy biphenyl or bis-2-(4-hydroxyphenyl)propane; the diaryl phosphonate is diphenyl methylphosphonate or diphenyl phenyl phosphonate; and the diaryl carbonate is diphenyl carbonate.

7. The process according to claim 1 wherein the reaction is conducted in an inert gas atmosphere.

8. The process according to claim 7 wherein step (a) is conducted at 250° to 320° C. and step (c) is conducted at 280° to 320° C.

9. Polyphosphonate polymer having from 0.3 to 4.5 percent carbonate moieties, on a molar basis relative to the molar sum of phosphonate and carbonate moieties, prepared by the process according to claim 1.

10. Polyphosphonate polymer having 0.5 to 2.5 percent carbonate moieties, on a molar basis relative to the molar sum of phosphonate and carbonate moieties, prepared by the process according to claim 2.

* * * * *